C. SCHINZ.
Furnace for Burning Gas.
No. 46,536. Patented Feb. 21, 1865.
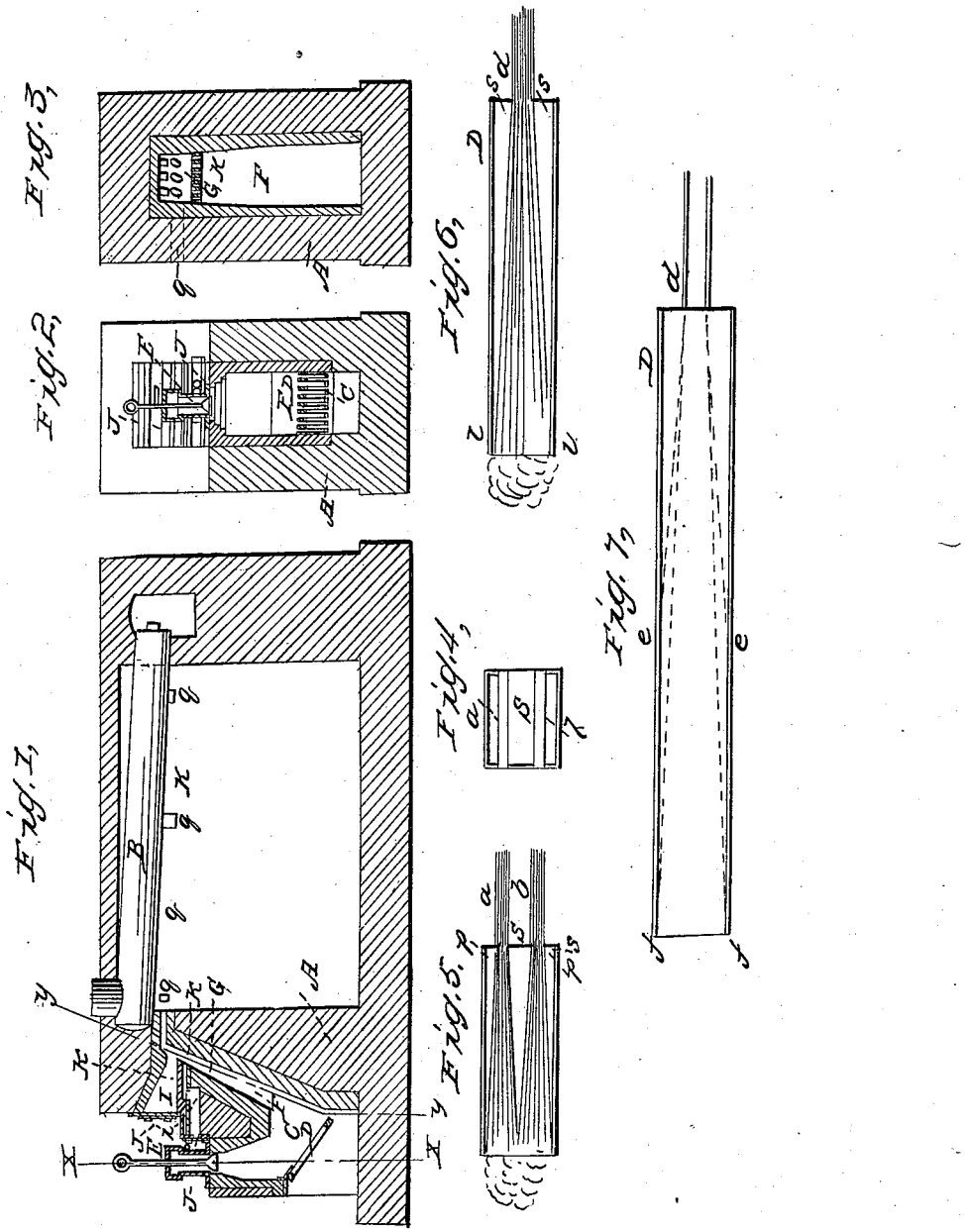

UNITED STATES PATENT OFFICE.

CARL SCHINZ, OF OFFENBURG, GRAND DUCHY OF BADEN.

IMPROVED FURNACE FOR BURNING GAS.

Specification forming part of Letters Patent No. 46,536, dated February 21, 1865.

*To all whom it may concern:*

Be it known that I, CARL SCHINZ, of Offenburg, in the Grand Duchy of Baden, have invented certain new and useful Improvements in Gas-Burning Furnaces; and I do hereby declare that the following is a full, clear, and exact description of the same, whereby those skilled in the art will be enabled to fully understand and use it, reference being had to the accompanying drawings, forming a part of this specification, in which—

Figure 1 represents a longitudinal vertical section of my invention. Fig. 2 is a transverse vertical section of the same, taken in the plane indicated by the line $x\,x$, Fig. 1. Fig. 3 is a similar section taken in the plane indicated by the line $y\,y$, Fig. 1. Figs. 4, 5, 6, and 7 are diagrams illustrating the action of the gases and the principle on which my invention is based.

Similar letters of reference in all the figures indicate corresponding parts.

The object of gas-burning furnaces and stoves is to obtain the largest possible useful effect of the fuel. This purpose is effected because this system offers the means, first, to produce the dry products of distillation obtained from the fuel more regularly than the direct mode of firing; second, to effect a complete combustion of all the combustible materials; third, to commingle the oxygen of the atmospheric air and the combustible materials in the proper proportion, and consequently neither a surplus of combustible gases nor of air exists, and the maximum effect of initial temperature resulting from the products of combustion is obtained. It is easy to determine by calculation the maximum effect which will result if all the above-named conditions are fulfilled; but if this theoretical result is compared with the effect really obtained in practice, a considerable difference will appear on the balance-sheet against practice, and in many cases this difference is so large that the gas-burning furnace produces a smaller useful effect than other good furnaces of the ordinary construction. For this reason the gas-burning furnaces have been replaced in many cases by such of ordinary construction, notwithstanding the great advantages of the gas-burning system when properly applied are well known.

The means of producing from fuel a regular supply of combustible gases have been known long ago, and as a general thing they are sufficient for all practical purposes; but the means employed to produce a perfect combustion of the gases and to commingle the air and gases in the proper chemical proportion have heretofore been very insufficient, and they are based on the simple rule that the velocities with which the air and the gases enter the furnace have to be different. This rule, however, was only applicable in such cases where the air was introduced by forced blast.

The object of this invention is to lay down the rules which, when properly applied to a gas-burning furnace, will render practicable the introduction of air and combustible gases in the proper chemical proportion, and thereby secure a perfect combustion. A furnace constructed according to these rules has to fulfill the following conditions: First, it has to furnish a sufficient contact-surface between the air and the combustible gases; second, it must be constructed so that the air and the gases enter the same with different velocities; third, provision must be made for compressing the air and gases as the same come in contact with each other; fourth, it must furnish the means to determine the proportion in which the air and gases enter, and to correct the same until the proper chemical proportion is attained.

First. The requisite amount of contact-surface between the air and gases is determined according to the following rules and observations: If smoke is blown through the tuyeres $a\,b$ of a long narrow cross-section, Fig. 4, it will be observed that the two currents formed thereby will unite at a certain distance beyond the mouths of the tuyeres. This distance is equal to 6.5 times the distance $s$ between the two tuyeres. If the two currents are introduced into a tube, $c$, of rectangular cross-section, (see Fig. 5,) it will be found that they touch the sides of that tube at the same distance above mentioned, provided that the spaces between the outer edges of the tuyeres and the inner surface of the tube are equal to one-half the space $s$ between the two tuyeres. Furthermore, if one tuyere be placed below a round or square tube the cross-section of which is larger than that of the tuyere, the current of smoke touches the sides of the tube at the distance $l=6.5(D-d,)$ where $D$ and $d$ designate the respective diameters of the tube and the tuyere. (See Fig. 6.) The contact-surface between the combustible gas and the air can be explained by forcing said gas through the tuyere $d$, Fig. 6, and letting the air follow through the open spaces $s\ s$, and the exact amount of contact-surface is determined by the formula $l=6.5(D-d).$ Numerous experiments demonstrate that one cubic foot of combustible gas introduced per second requires a contact-surface of 3.837, or nearly four square feet, if the products of combustion are drawn off by natural draft or by exhausters; but if the gases or the air, or both, are introduced by forced blast, four square feet of contact-surface are equal to two cubic feet of gas per second.

Second. The correct difference in the velocity of the air and gases is determined as follows: In cases where the combustible gases and the air are introduced by forced blast, this velocity is regulated by suitable dampers or registers, or by regulating the speed of the blast-machines; but in cases where no forced blast is used and the products of combustion are carried off by natural draft or by exhausters, it is of equal or of still greater importance than in the former case, to obtain the requisite difference in the velocity of the gases and the air. The velocity of the gases must be larger than that of the air, and this purpose is effected by placing the generator to such a depth that the gases ascending with their initial temperature will acquire sufficient pressure to allow their escape with the desired velocity. If the depth of the generator or the perpendicular height from the grate to the level of the flue or channel through which the gas escapes is designated by $h$, the specific gravity of the gas at the temperature of its egress by $S$, the specific gravity of the gas at $0°$ by $S_0$, and the head of the gases due the velocity by $H$, we have $$H = h - hSS_0 \quad \ldots \ldots \ldots \ldots 1.$$
$$h = \frac{H}{1 - SS_0} \quad \ldots \ldots \ldots \ldots 2.$$

For instance, if the cross-section of the tuyere, Fig. 4, is equal to 0.328 feet by 0.0295 feet, and the quantity of gas to be introduced per second equal to 0.07 cubic feet, the necessary velocity would be $$\frac{0.07}{0.328 \times 0.295} = 7.2 \text{ feet,}$$

and the head due to this velocity $$H = \frac{(7.2)^2}{2g} = 0.807 \text{ feet.}$$

Supposing, further, that the combustible gases are to be produced from peat, the head requisite to overcome the resistance in the generator would be estimated to be 4.9, or nearly five feet, and we would have:

$$h = \frac{0.807 + 5}{1 - 0.23037 \times 0.91422} = 7.22 \text{ feet,}$$

where 0.23037 and 0.91422 represent the respective specific gravities of the temperature of their egress and at $0°$. The height of the grate below the channel or flue through which the gases escape would have to be 7.22 feet, and from this example it will be easy to determine the position of the grate in relation to the flue for furnaces of any description.

Third. The compression of the gases and air while in contact is effected according to the following rules: In forcing currents of air or gas through a tuyere into a larger tube, Fig. 6, a suction is produced, causing the air to rush in through the open spaces between the tuyere and tube with more or less velocity, according to the proportion $\frac{d}{D}$ between the diameters of the tube $D$ and the tuyere $d$. By this suction the initial velocity of the gas entering from the tuyere is naturally diminished, and this diminution I designate with negative head $H_n$. This negative head is found by the following table:

$$\frac{d}{D} = 0.2, \quad 0.3, \quad 0.4, \quad 0.5, \quad 0.6, \quad 0.7, \ldots .3,$$
$$H_n = 0.13H, 0.30H, 0.27H, 0.20H, 0.14H, 0.05H \ldots .4,$$

where $H$ represents the head due to the initial velocity of the gas with which it leaves the tuyere. In order to impart to the gases moving in the tube $D$ the requisite velocity therefor, the head due to the initial velocity must be augmented by the negative head. For instance, if the desired velocity would be 32.81 feet per second, and the value $\frac{d}{D}$ was equal to 0.2, the head of 16.69 feet due to the velocity of 32.81 feet would have to be multiplied with 1.13, which gives 18.89 feet as the head required to produce the above-named velocity of 32.81 feet per second. This increased head, however, has no tendency to compress the gases in the tube $D$, and in order to effect this compression a certain resistance must be created at the mouth of the tube, and the head must be augmented in proportion to this resistance. The additional head requisite to overcome this resistance represents the lateral pressure of the gases against the sides of the tube $D$ and the force with which the gases within said tube are compressed. The effect of the compression of the gases is illustrated in Fig. 7. In that figure the lines $d\ e\ d\ e'$ inclose the gas cone formed by the gases emanating from the tuyere $d$. Between the points $e\ f\ e'\ f'$ the current of gas presses against the sides of the tube $D$, and a second current of almost equal force is required to elongate the cone $d\ e\ e'$ and bring it in the shape $d\ f\ f'$, and if such a current is admitted to the tube $D$ both currents are under a pressure due to the force with which the first current endeavors to reach said sides. By the use of these two currents the contact-surface of the two gases is considerably increased. A pressure of 49.2 or fifty feet expressed in a column of air is sufficient to secure a perfect combustion, if the contact-surface corresponds to the proportion of one cubic foot of gas to four superficial feet. It is obvious that this compression cannot be effected if the gases pass in and out of the furnace by natural draft, and in order to compensate for this the contact-surface has to be doubled.

Fourth. The means employed for the purpose of determining and correcting the proportion between the gases and air are based on the following rules: Notwithstanding it was known long ago that the combustion of the gases must take place in a comparatively narrow channel previous to introducing the products of combustion into the space in which they have to give up the heat, strange to say it has been neglected, in all cases which have come under my observation, to give to said channels anything like proper proportions. They are all twice as high as they are wide, and proportioned to the tuyeres so that the length of the gas-cone would be four feet in one direction and only 1.5 feet in the other. Moreover, the length of the channels never exceeded two feet, and notwithstanding sufficient provision is made for a contact-surface the two cones would not be allowed to touch each other, and consequently it was impossible to prevent the escape of unconsumed gas or air, while the combustion was effected for the greater part in the furnace itself. These defects, which were alone sufficient to render the success of the gas-burning furnaces doubtful, disappear completely by the application of the rules above explained. Even in case the products of combustion are carried off by natural draft or exhaust, the means mentioned—viz., the application of an abutment or other obstruction to increase the resistance of the gases in the combustion channels or flues—are sufficient to confine the combustion to said channels or flues, although there might be a small excess of ineffectual air.

The success of the combustion in my furnace is judged by observing the products of combustion through small openings in the side walls of the furnace, and according to these observations the supply of air and gas is regulated.

It is obvious, since the cross-sections of the tuyeres are always smaller than those of the combustion channels or flues, that the velocity of the current of air issuing from the free open spaces around the tuyeres will be smaller than that of the current issuing from the tuyeres, and consequently the head due to the velocity of the former will be considerably less than that due to the velocity of the latter. In cases where the products of combustion are carried off by natural draft or suction, which acts upon both currents—that one through the open spaces and that one through the tuyeres—it is sufficient to retard that one through the tuyeres by some obstruction, so that it is not drawn in any quicker than required to produce the exact chemical proportion. This obstruction may consist of a simple register or damper. In contracting the passage by means of the register or damper the quantity introduced is diminished, and in enlarging said passage the quantity is increased. If by the color of the products of combustion it should be observed that there is an excess of gas, the supply of air is increased by opening the register, and vice versa. In case the air is injected by forced blast, causing a pressure upon the gases in contact, as shown in Fig. 7, it is always the combustible gas which is introduced through the spaces around the tuyeres, and the head acting upon the gas is consequently small compared with that corresponding with the pressure of the current of air forced through the tuyeres. But in order to obtain the phenomena represented by Fig. 7, it is necessary to increase the pressure without increasing the velocity. The pressure must be a little below the lateral pressure of the air-current, so that the air-cone will assume the form $dff$. This object is effected by a register or damper placed above or below the generator. The pressure of the air-current is measured and controlled by a manometer attached to the blast-machine. The application of these rules to a steam-boiler furnace will be readily understood from the following description:

A represents the brick walls which support the steam-boiler B. C is the generator, which is provided with a fire-grate, D, and to which fuel is introduced through the charger E. The combustible gases formed in the generator C rise through the channel E, which is provided with the gas-splitter G. Said gas-splitter consists of a series of small tuyeres or channels, $k$, which divide the gases rising from the generator into a number of small jets, and which can be opened or closed by a suitable register, $k'$. The air is introduced through a series of channels, $i$, which are closed or opened by the slide $j$, and by means of the slide the supply of air is regulated to the required chemical proportion. A window, J, leading to the chamber I, allows of observing the process. The mixed air and gases are burned in the combustion channels or flues $o$, and on emanating from these flues the products of combustion pass into the space, where they give up their heat, and they are finally carried off by the natural draft of a chimney, or by a suitably exhauster. Holes $q$ in the side walls give an opportunity to observe the products of combustion and to judge of their composition. The construction of this furnace and the application of the rules explained in the previous pages to the same will be made perfectly clear by the following example: If the grate-bars in the generator C are 5.25 feet below the surface of the combustion-flues $o$, and the fuel used is soft coal producing gas the initial temperature of which is 1300° centigrade, then we obtain, by the application of the equation 1 for the head under which the gases ascend, $$H = 5.25 - 5.25 \times 0.173 \times 0.958 = 4.375 \text{ feet},$$

where 0.173 is the specific gravity of the gas at the temperature of 1300°, and 0.958 that of the gas at 0°. If the consumption of fuel is equal to twenty-two pounds per hour, the volume of the gas produced is 1.9 cubic feet, and if the number of tuyeres in the gas-spreader is sixteen, and each tuyere has a cross-section of $0.0295 \times 0.3936$ feet, the velocity of the gas passing through said tuyeres is $$v = \frac{1.9}{16 \times 0.295 \times 0.3936} = 10.22 \text{ feet}.$$

The head corresponding to this velocity is 1.6 feet. The quantity of atmospheric air required to consume this gas is 0.5378 cubic feet per second. This air enters between the gas-tuyeres through seventeen small channels, $i$, the combined cross-sections of which are equal to 1.1528 square feet, and consequently the velocity of the air is $$v' = \frac{0.5378}{1.1528} = 0.466 \text{ feet,}$$

which corresponds to a head of 0.003378 feet. The proportion between the combined areas of the tuyeres and those of the open spaces around them is to be 0.4, and consequently the negative head produced by the issue of the gas will be twenty-seven hundredths of the head, due to the velocity of the issuing gas, or 0.438 feet, according to the formulas 3 and 4. This velocity is larger than necessary for the aspiration of the air, and it is reduced by closing or partially closing the register $j$, through which the air is taken, as follows: 0.438—0.003378=0.435 feet, and the head required for the gases 1.6+0.438=2.038 feet, while that produced by the ascending gases is 4.375 feet, leaving a surplus head of 4.375—2.038=2.337 feet, or more than enough to overcome the resistance produced by the fuel in the generator. A suitable register placed over the tuyeres $k$ of the gas-spreader will have to be closed until the supply of gas assumes the proper proportion. Furthermore, 1.9 cubic feet of gas require 4×1.9=7.6 square feet of contact-surface. The height of the various gas-cones is 0.069×6.5=0.4477 feet, and the length of the tuyeres is 0.3936 feet; consequently the entire contact-surface is equal to 16×2×0.396×0.4477=7.2 square feet, not taking into account the narrow sides of the cones. The length of the combustion-flues is 2.6 feet. A portion of the same is visible through the window J, and the egress of the products of combustion can be observed through a hole, $q$, in the side wall. The same principle is applicable with slight modifications to furnaces in which either the gas or the air, or both, are introduced by forced blast.

What I claim as new, and desire to secure by Letters Patent, is—

1. The employment or use of the gas-splitter G with two or more tuyeres, $k$, in combination with the generator C, air-inlet $i$, and combustion-flue $o$ or its equivalent, constructed and operating in the manner and for the purpose substantially as herein specified.

2. The employment or use of two or more air-tuyeres, $i$, in combination with the channel F, rising from the generator C, and with the combustion-flue $o$ or its equivalent, constructed and operating substantially as and for the purpose set forth.

3. The employment or use of two or more combustion-flues, $o$, proportioned according to the rules above specified, and arranged in combination with the gas-channel F and air channel or channels $i$, substantially in the manner and for the purpose set forth.

4. The application of a window, J, in front and one or more loop-holes, $q$, in the rear of the combustion-flues $o$, substantially as and for the purpose specified.

CARL SCHINZ.

Witnesses:
ALEX TRIPPET,
J. K. VAN CAMPEN.